United States Patent [19]
Bohland

[11] Patent Number: 5,545,483
[45] Date of Patent: Aug. 13, 1996

[54] POLYAMIDE MICROCAPSULES REACTED WITH ISOCYANATE EMULSION

[75] Inventor: John R. Bohland, Millbury, Ohio

[73] Assignee: Moore Business Forms, Inc., Grand Island, N.Y.

[21] Appl. No.: 69,398

[22] Filed: Jun. 1, 1993

[51] Int. Cl.⁶ ............................. A01N 25/34; B01J 13/02
[52] U.S. Cl. ................... 428/402.21; 428/402.2; 264/47; 427/213.34
[58] Field of Search ............................ 428/402.21, 402.2; 264/4.7; 427/213.34

[56] References Cited

U.S. PATENT DOCUMENTS

| | | | |
|---|---|---|---|
| 4,000,087 | 12/1976 | Maalouf | 252/316 |
| 4,209,188 | 6/1980 | Chao et al. | 282/27.5 |
| 4,308,165 | 12/1981 | Vassiliades et al. | 424/33 |
| 4,324,683 | 4/1982 | Lim et al. | 424/32 |
| 4,353,809 | 10/1982 | Hoshi et al. | 252/316 |
| 4,409,201 | 10/1983 | Heinrich et al. | 424/32 |
| 4,497,793 | 2/1985 | Simkin | 424/32 |
| 4,534,783 | 8/1985 | Beestman | 264/4 |
| 4,586,060 | 4/1986 | Vassiliades | 264/4.3 |
| 4,599,271 | 7/1986 | Chao | 428/402.21 |
| 4,737,484 | 4/1988 | Iwasaki et al. | 430/138 |
| 4,778,781 | 10/1988 | Washizu et al. | 264/4.3 |
| 5,075,279 | 12/1991 | Sano | 264/4.7 |
| 5,120,349 | 6/1992 | Stewart et al. | 428/402.22 |

*Primary Examiner*—Shean C. Wu
*Attorney, Agent, or Firm*—Finnegan, Henderson, Farabow, Garrett & Dunner

[57] ABSTRACT

Polyamide microcapsules are reacted with an isocyanate emulsion to reduce microcapsule yellowing and decrease microcapsule permeability when used in carbonless copying systems. The isocyanate reacts with the surface of the polyamide shell to close discontinuities in the shell and improve impermeability. The isocyanate also reacts with free amines in the capsule slurry to reduce the presence of free amines that cause yellowing.

53 Claims, No Drawings

POLYAMIDE MICROCAPSULES REACTED WITH ISOCYANATE EMULSION

BACKGROUND OF THE INVENTION

The present invention relates to improved microcapsules, and more specifically, to microcapsules that are highly impermeable and, when used in carbonless copying systems, result in greatly reduced yellowing.

Microcapsules generally comprise a core of fill material, typically having a size in the range of microns, surrounded by a wall or shell of polymeric material. The fill material may be either gaseous, liquid or solid and may be composed of a single substance, a solution or a mixture. The wall surrounding the core of fill material typically functions to isolate the fill material from an external environment until it is desired to have the fill material available, at which time the capsule wall is ruptured or removed in some fashion such as by mechanical pressure, dissolution or the like. Certain types of microcapsules are intended to remain intact without removal or rupture of the capsule wall such as microspheres, microbeads and the like.

There are many different uses for microcapsules and many different materials that may be microencapsulated. Of particular importance are the use of microcapsules in medicinal preparations, fertilizers, flavorings, detergents, laundry brighteners, perfumes, disinfectants, deodorizers, adhesives, carbonless copying systems and the like.

Numerous methods or techniques for preparing microcapsules and microcapsular products have been disclosed. A majority of these methods generally comprise providing a dispersed phase of minute discrete droplets containing the intended fill material in a continuous phase and then forming encapsulating walls or shells around the minute droplets. Specific methods for forming the encapsulating walls around the droplets include simple and complex coacervation, interfacial polymerization, polycondensation and the like. Specific patents relating to microencapsulation methods include U.S. Pat. No. 3,429,827 to Ruus, relating to an interfacial polycondensation type method, U.S. Pat. No. 3,578,605 to Baxter, relating to an acid chloride-gelatin-gum arabic dual-wall type method and U.S. Pat. No. 3,016,308 to Macaulay, relating to a urea-formaldehyde condensation type method, among others.

While microcapsules and microencapsulation techniques are applicable to a wide variety of products, perhaps one of the most significant applications is in their use in carbonless copying systems. While the present invention is particularly adaptable to carbonless copying systems and will be discussed primarily hereinafter with regard to such systems, it should be understood that the invention is not thereby so limited and may be used in any application where the improved properties of the microcapsules are beneficial.

Standard carbonless copying systems include a plurality of substrates, e.g., paper sheets, arranged in a manifold, each sheet having one or more coatings on a surface thereof. The manifold is designed so that when external pressure caused by a typewriter, pen, or other instrument is applied to the outermost sheet, a colored image will be formed on at least one surface of each sheet of the manifold.

The top sheet of the manifold to which the pressure is applied has a coating on its back surface. This coated back surface includes microcapsules containing an initially colorless chemically reactive color-forming dye precursor as the fill material. The front surface of the next sheet, which is adjacent to the back surface of the top sheet, is coated with a material containing a component, such as phenolic resin or reactive clay, that is capable of reacting with the colorless dye precursor contained in the microcapsules to produce a color. Thus, an external pressure on the front surface of the top sheet will rupture the microcapsules on the back surface and release the colorless dye precursor which then chemically reacts with the reactive component of the coated front of the adjacent sheet to produce a colored image corresponding to the area of pressure. Similarly, colored images are produced on each successive sheet of the manifold by the external pressure rupturing the microcapsules carried on the bottom surface of each sheet.

The sheets of the carbonless copying system manifold are designated in the art by the terms CB for "coated back", CFB for "coated front and back," and CF for "coated front." The CB or transfer sheet is usually the top sheet of the manifold and the sheet to which the external pressure is applied. The CFB sheets are the intermediate sheets of the manifold, each of which is able to have an image formed on its front surface by a pressure, and each of which also transmits the contents of ruptured microcapsules from its back surface to the front surface of the next sheet. The CF or recording sheet is the bottom sheet and is coated only on its front surface so that an image can be formed on it.

While it is customary to have the coating containing the microcapsules on the back surface of the sheets and to have the coating containing the reactive component for the capsules on the front surface of each of the sheets, the reverse arrangement is also possible. In addition, one of the reactive ingredients may be carried in the sheets themselves, rather than applied as surface coatings. Furthermore, the component that reacts with the colorless dye precursor may also be microencapsulated.

As indicated above, a variety of arrangements exist for providing carbonless copying systems, the most common arrangement and the arrangement to which the present invention is particularly adaptable, is a system where microcapsules having a fill material including an initially colorless, chemically reactive, color forming dye precursor are coated on the back surfaces of each of the sheets of the manifold set and a dry coating containing a reactive component for the dye precursor is coated on the front surfaces of each of the sheets of the manifold set.

The most common microcapsules used in carbonless copying systems are those composed of polyamide, epoxy, or polyurea. One disadvantage of carbonless copying systems using polyamide microcapsule systems is the inadvertent and unintentional development of color on the CF coatings and the CB sheet. This inadvertent color development may be caused by the presence of free colorless dye precursor in the CB coatings due to incomplete encapsulation of the dye precursor or may be caused by accidental microcapsule rupture which can occur during handling, coating processes, printing processes and the like. In addition, the walls of the microcapsules may include faults or pores which allow the colorless dye precursor to leak from the microcapsules. This free dye precursor often causes discoloration by contacting the CF component by passing through the base paper in the CFB sheets and also from sheet to sheet in a manifold set. Discoloration, which is variously referred to as blush, offset, bluing, ghosting, back print, etc. is highly objectionable and undesirable in a copying system.

Another shortcoming of polyamide microcapsules for use in carbonless copying systems is a tendency for the microcapsules to cause "yellowing" of the base paper, particularly when used with groundwood base papers. Such yellowing is an undesirable by-product of prior art polyamide microcapsule systems.

A further disadvantage of carbonless copying systems using polyamide microcapsules is the presence of excess amine on the surface of the microcapsules and in the microcapsule slurry. Such reactive amines are present during the production process and also in the finished product carbonless paper. These amines, such as diethylenetriamine, can be easily absorbed through human skin and can cause dermatological reactions upon contact, thus creating potential health and safety hazards both for workers and for users of carbonless paper.

U.S. Pat. No. 4,209,188 to Chao et al. discloses a technique for producing microcapsules having reduced discoloration from leakage or premature rupture. These microcapsules are produced by reacting a methylolated epoxy compound with the material of the outermost surface of the microcapsule to close discontinuities in the encapsulating wall. While the microcapsules and method disclosed by this patent address the first shortcoming discussed above, i.e., discoloration caused by premature microcapsule rupture or leakage, they do not address the problems of microcapsule "yellowing" or human exposure to amine compounds.

The principle advantage of the present invention is to provide microcapsules and a method for making microcapsules which substantially obviate one or more of the limitations and disadvantages of the described prior microcapsules.

The present invention is directed to polyamide microcapsules usable in carbonless copying systems that have highly impermeable capsule walls.

The present invention is also directed to polyamide microcapsules usable in carbonless copying systems that do not cause significant discoloration of the base paper.

The present invention is further directed to polyamide microcapsules usable in carbonless copying systems that are free of faults or pores that may allow premature rupture or leakage of the core material.

The present invention is also directed to polyamide microcapsules usable in carbonless copying systems that exhibit reduced yellowing of the base paper.

The present invention is further directed to polyamide microcapsules usable in carbonless copying systems using groundwood base papers without significant yellowing.

The present invention is also directed to polyamide microcapsules usable in carbonless copying systems that have a reduced amount of free amines to minimize hazardous exposure to humans.

The present invention is also directed to a process for producing polyamide microcapsules usable in carbonless copying systems that are highly impermeable and exhibit reduced yellowing.

Additional features and advantages of the invention will be set forth in the written description which follows, and in part will be apparent from the written description or may be learned from the practice of the invention. The advantages of the invention will be realized and attained by the microcapsules and process for manufacturing microcapsules, particularly pointed out in the written description and claims hereof.

SUMMARY OF THE INVENTION

To achieve these and other advantages, and in accordance with the purpose of the invention as embodied and broadly described herein, the present invention provides highly impermeable reduced-yellowing microcapsules, carbonless paper based on said microcapsules and a process for manufacturing such microcapsules. This process includes the steps of providing a slurry of microcapsules, each microcapsule including a core material and at least one generally continuous polyamide wall encapsulating the core material, and contacting the slurry of microcapsules with an isocyanate emulsion.

In accordance with the invention, more specifically, a process for producing highly impermeable, reduced yellowing microcapsules is provided which includes providing in a continuous phase, a dispersed phase of minute discrete droplets containing a core material. Generally continuous encapsulating walls of polyamide are formed around the minute discrete droplets to produce a microcapsule slurry. An isocyanate emulsion is then added to the microcapsule slurry. The isocyanate emulsion and microcapsule slurry is heated to a temperature and for a time sufficient to cause the isocyanate to react with the surfaces of the polyamide microcapsule walls to close discontinuities in the outer portion of the walls and also to react with free amine in the microcapsule slurry to reduce a potential source of yellowing.

In accordance with the invention, more specifically, a process for producing highly impermeable, reduced yellowing microcapsules is provided which includes providing a mixture of a core material and an acid chloride. The mixture is emulsified in an emulsifying agent to obtain an oil-in-water emulsion of microparticles. A polyfunctional amino compound is added to the emulsion to form a slurry of polyamide microcapsules which envelope the core material, after which a neutralizing solution is added to the slurry of microcapsules. An isocyanate emulsion is then added to the microcapsule slurry. The isocyanate emulsion and microcapsule slurry is heated to a temperature and for a time sufficient to cause the isocyanate emulsion to react with the surfaces of the polyamide microcapsule walls to close discontinuities in the outer portion of the walls and also to react with free amine in the microcapsule slurry to reduce a potential source of yellowing.

In accordance with the invention, as embodied and broadly described herein, a microcapsule is provided that includes a core material and at least one substantially continuous polyamide wall encapsulating the core material. At least a portion of the outer surface of the microcapsule comprises the reaction product of an isocyanate emulsion and the outer surface of the microcapsule wall.

In accordance with the invention, more specifically, a microcapsule is provided including a minute discrete droplet of core material and a pressure rupturable, generally continuous wall encapsulating the droplet. The wall includes at least one layer of polyamide. Discontinuities in the outer layer of the polyamide wall are closed by the reaction product of an isocyanate emulsion and the polyamide of the outer layer. This reaction product is believed to be a polyurea/polyamide copolymer.

In accordance with the invention, as embodied and broadly described herein, a carbonless copying system is provided. The system includes a substrate, a coating containing a plurality of the microcapsules of the invention over at least a portion of the substrate and a material in reactive contact with the microcapsules capable of reacting with the microcapsule core material to produce a colored reaction product.

Further advantages and features of the invention will become more apparent from a detailed consideration of the remainder of the specification including the Examples and the appended claims.

It is to be understood that both the foregoing general description and the following detailed description are exemplary and explanatory and are intended to provide further explanation of the invention as claimed.

DETAILED DESCRIPTION OF THE PREFERRED EMBODIMENTS

In accordance with the invention, as embodied and broadly described herein, highly impermeable, reduced yellowing microcapsules are provided. These microcapsules are produced by providing a slurry of microcapsules, each microcapsule including a core material and at least one generally continuous polyamide wall encapsulating the core material, and contacting the slurry of microcapsules with an isocyanate emulsion.

The present invention is applicable generally to polyamide microcapsule systems. A particularly preferred microcapsule composition is polyterephthalamide. Polyamide microcapsules can be made by several techniques known in the art. A preferred encapsulation technique is interfacial polymerization. The interfacial polymerization method involves mixing the material or materials to be microencapsulated together with a suitable acid chloride monomer. The resultant mixture is emulsified in an emulsification agent to obtain an oil-in-water emulsion. A polyfunctional amino compound is then added into the emulsion, whereby polyamide microcapsule walls are formed around each microparticle of oil.

In accordance with the invention, the core material to be encapsulated may be, for example, a colorless dye precursor. Colorless dye precursors that can be used in the invention include, for example, crystal-violet lactone, benzoyl leucomethylene blue, rhodamine lactam, the p-toluene sulfinate of Michler's hydrol, or any of the various chromogenic compounds that are capable of changing from a colorless to a colored form on contact with an acidic substance, such as a phenolic resin or a reactive clay.

Acid chlorides that can be used in the invention to produce polyamide microcapsules include, but are not limited to: terephthaloyl chloride, isophthaloyl chloride, 1,3,5-benzenetricarboxylic acid chloride, sebacyl dichloride, 4,4-sulfonyldibenzoyl chloride, 1,3-benzenedisulfonyl chloride, 1,4-benzenedisulfonyl chloride, or mixtures thereof. A preferred acid chloride for use in the invention is terephthaloyl chloride.

The emulsifying agents that can be used in accordance with the invention include those compounds that contain both hydrophilic and hydrophobic groups in the same molecule. Examples include, but are not limited to: polyvinyl alcohols, starch derivatives, cellulose derivatives, polyacrylamide, and the like. A preferred emulsification agent for use in the invention is partially hydrolyzed polyvinyl alcohol.

Examples of polyfunctional amines that can be used in the invention include, but are not limited to: ethylenediamine, diethylenetriamine, triethylenetetramine, tetraethylenepentamine, 1,6 hexanediamine, polyethyleneimine, bis-hexamethylenetriamine, and the like. A preferred polyfunctional amine for use in the invention is diethylenetriamine.

In accordance with the invention, as embodied and broadly described herein, the microcapsules of the invention are contacted with an isocyanate emulsion. This isocyanate emulsion reacts with the amino groups and/or amide sites at least on the outermost surfaces of the polyamide microcapsules. This closes discontinuities in the polyamide capsule wall surface, resulting in a capsule wall that is highly impermeable to the core material, such as the color former solution. It is believed that the isocyanate compound reacts with the surface amino groups or amide sites to form a polyamine/polyurea copolymer skin. In addition, the isocyanate reacts with free amine remaining in the aqueous microcapsule slurry. This reduces the amount of free amine that is available to react with the base paper of carbonless copying systems, which reaction causes yellowing of the base paper. It is believed that the free amines react with lignin in the base paper, since base sheets containing high amounts of groundwood, and thus more lignin, suffer from greater amounts of yellowing than base sheets with low amounts of groundwood. A reduction in the amount of free amine in the microcapsule system also reduces exposure to humans of potentially harmful amines.

In accordance with the invention, the isocyanate emulsion is preferably based on a polyfunctional isocyanate. More preferably, the isocyanate emulsion includes an aromatic diisocyanate such as diphenylmethane diisocyanate or toluene diisocyanate. Examples of these include 4,4'-diphenylmethane diisocyanate, 2,4-toluene diisocyanate and 2,6-toluene diisocyanate. The most preferred aromatic diisocyanate is an oligomer of 4,4'-diphenylmethane diisocyanate. An example of an isocyanate emulsion that can be used in the invention is an aqueous emulsion of about 50% of an oligomer of 4,4'-diphenylmethane diisocyanate (DOW PAPI 2027, available from Dow Chemical, Midland, Mich.) in a 3% aqueous solution of polyvinyl alcohol. The polyvinyl alcohol emulsifying agent may be, for example, Airvol 540 (available from Air Products and Chemicals, Allentown, Pa). It is believed that DOW PAPI 2027 has the following formula:

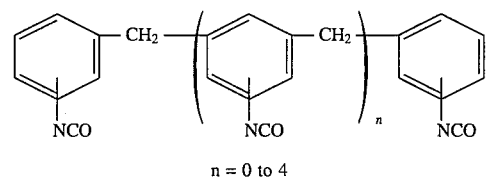

n = 0 to 4

It is preferred that the isocyanate be present in an amount ranging from about 1 to about 12 parts by dry weight per 100 parts by dry weight of microcapsules, more preferably about 5 to about 7 parts per 100 parts of microcapsules. The isocyanate emulsion is caused to react with free amine in the microcapsule slurry and with amino groups and/or amide sites on the surfaces of the capsules by adding the isocyanate emulsion to the slurry of microcapsules and heating to a temperature and for a time sufficient to cause the isocyanate to react with the amine and/or amide. For example, the isocyanate/slurry mixture may be heated to a temperature of about 50° to about 75° C. for a time of about 5 to about 120 minutes.

Although the present invention is generally applicable to all polyamide microcapsule systems, a particularly preferred embodiment is the use of a reduced amine process to produce the microcapsules, followed by the isocyanate treatment. The reduced amine process involves the use of a much smaller excess of polyfunctional amine in the interfacial polymerization reaction. Conventional interfacial polymerization processes for producing polyamide microcapsules use a relatively large excess of the polyfunctional amine for two reasons: (1) the excess amine serves as a neutralization agent since it is very alkaline; and (2) the excess amine acts as an organic base, reducing the need for a separate inorganic base as a neutralization reagent, which can cause the emulsifying agent to gel and increase viscosity beyond acceptable levels.

The reduced amine process solves these problems by reducing the amount of inorganic neutralizing agent during encapsulation, maintaining a pH of about 4.0. This is sufficiently alkaline to allow the reaction between the acid chloride and polyfunctional amine, but not alkaline enough to cause precipitation or gelling of the emulsifying agent. Larger amounts of neutralization agent can then be added after the interfacial polymerization process is complete. It has been found that a 15–17% solution of caustic soda added after polymerization achieves neutralization without adversely affecting viscosity. This enables a neutral capsule slurry (pH 7.0) to be obtained at an acceptable viscosity (100–200 centipoise) at about 34% solids.

Because the reduced amine process uses a lesser excess of polyfunctional amine, this reduces the amount of unreacted amine in the capsule slurry. Thus, addition of the isocyanate emulsion to microcapsules produced by the reduced amine technique allows the isocyanate to eliminate residual free amine and to react with amino and/or amide groups on the microcapsule surfaces. This results in reduced yellowing, decreased shell wall permeability, and decreased amounts of potentially hazardous amines.

It has been found by the present inventor that the isocyanate emulsion, after emulsification, should be immediately added to the neutralized capsule slurry. If the isocyanate is not added shortly after it is emulsified, it may decompose after prolonged contact with water.

The following examples further illustrate advantageous features of the present invention and are illustrative of the various features of the present invention.

Example 1

Microcapsules made in the laboratory by the reduced amine process were treated with an isocyanate emulsion in accordance with the invention. The treated microcapsules were tested to determine yellowing and permeability as compared to untreated capsules.

The reduced amine polyamide laboratory capsules were made by dissolving 7.08 grams of a three component proprietary colorless dye composition in 66.0 grams of alkylbiphenyl oil supplied by Koch Chemicals of Wichita, Kans. The solution was first heated to 130° C. to dissolve the dyes then cooled slightly to 110° C. The oil phase monomer solution was prepared by adding 14.28 grams of terephthaloyl chloride to 65.28 grams of Alkylate 273 (a linear alkyl benzene oil supplied by Monsanto Chemicals of St. Louis, Mo.), then heating to 50° C. to dissolve. The water phase monomer solution was prepared by dissolving 4.82 grams of diethylenetriamine and 4.28 grams soda ash in 48.43 grams of water at room temperature with stirring. An emulsification solution was prepared by diluting 88.06 grams of a previously prepared 10% polyvinyl alcohol solution to about 3.2% with 192.30 grams water. The emulsifier solution was heated to 50° C.

To prepare the microcapsules, the dye/alkylbiphenyl solution and the acid chloride/linear alkylbenzene solution were emulsified for one minute in the polyvinyl alcohol solution. The diethylenetriamine solution was added immediately after emulsification to initiate the interfacial polycondensation reaction. The capsules were cured by heating at 70° C. for one hour with constant stirring. After curing, about 16 grams of a 17% caustic soda solution was slowly added to obtain a neutral slurry pH. Particle size averaged about six microns and the slurry pH was about neutral (7.0).

The isocyanate emulsion was made by blending in a Waring blender at maximum rpm, 50 grams of a 3.3% aqueous solution of Airvol 540 polyvinyl alcohol and 50 grams of Dow PAPI 2027 polymethylene polyphenylisocyanate for two minutes at room temperature. The particle size of the resulting emulsion was 4.6 microns.

The isocyanate emulsion was added to the reduced amine polyamide laboratory microcapsule slurry and heated to about 60° C. for about 10 minutes. The capsule slurry changed in color from off-white to a light purple/gray, which seemed to indicate completion of the isocyanate reaction. The isocyanate emulsion was added to the reduced amine polyamide laboratory capsules in an amount of 16% by weight per dry weight of microcapsules (8% by wt. of isocyanate compound per dry wt. of capsules). Coatings were made for each sample by drawing down over 13 pound Great Northern 100% groundwood fiber base stock paper using a number 7 Meier rod. Also, each coating was drawn down over Moore 2010 CF reference standard.

The coatings were allowed to air dry. The Great Northern groundwood fiber paper coated with the isocyanate treated microcapsules was tested for yellowing. Appearance measurements were made using a Hunter Labscan instrument. Yellowing was measured by the Hunter YI313 Yellowness Index and whiteness was measured by the Hunter WI313 Whiteness Index. Results are shown in Table 1.

Permeability measurements were made by determining the photovolt reflectance values of the uncoated Moore 2010 CF reference standard with the photovolt reflectance values of the Moore 2010 CF coated with isocyanate treated microcapsules both before and after heating at 150° C. for 15 minutes. The difference between the reflectance values before and after heating is a measure of the amount of microcapsule dye material that is lost through the capsule wall. Results are shown in Table 1.

It can be seen from this testing that reduced amine polyamide laboratory capsules that are coated with an 8% isocyanate emulsion in accordance with the invention have a yellowness and whiteness that approaches that of uncoated groundwood paper. In addition, it can be seen that permeability of the 8% isocyanate coated capsules is greatly improved over uncoated capsules.

Example 2

Conventional polyamide production capsules were treated with an isocyanate emulsion in accordance with the invention. The capsules were treated with different amounts of isocyanate emulsion and tested to determine yellowing and permeability as compared to untreated capsules.

The conventional polyamide production capsules were prepared using the same proportions as the laboratory capsules of Example 1. Five process tanks were used for product curing (polymerization) and storage. The concentrated emulsifier solution was prepared by heating 250 pounds of polyvinyl alcohol (Air Products) in 270 gallons of water to about 95° C. for one hour. This solution was subsequently diluted to about 3.2% by mixing it with 660 gallons of water in a second polyvinyl alcohol tank. The solution was held at 50° C. Another process tank contained the alkylbiphenyl oil and colorformers (dyes). This tank was maintained at 110° C. Another tank contained linear alkyl benzene oil and the acid chloride, oil phase monomer. This tank was kept at 50° C. The last tank contained water, caustic soda, soda ash and the water phase monomer, diethylenetriamine. This tank was kept at 43° C.

The polyvinyl alcohol emulsifier solution, the alkylbiphenyl/colorformer solution and the linear alkyl benzene/acid chloride monomer solution were pumped together first. Emulsification of the oil and water phase was achieved by pumping the metered and mixed ingredients through a series of restrictor plates—metal disks about two inches in diameter with a random pattern of 1/16 inch to 1/8 inch holes drilled in them. The holes created enough shear at operating pressure to provide an oil-in-water emulsion having about six micron particle size. The water phase monomer, diethylenetriamine, was added just after the other ingredients passed through the series of restrictor plates.

The capsule slurry was pumped to a polymerization tank equipped with heat and chill capacity for curing then cooling the capsules to prepare them for storage in other, larger tanks. Capsules were held in the polymerization tank for three to four hours at 66° C. before being cooled just prior to transport to a capsule storage vessel.

The isocyanate emulsion was made by blending, at high speed in a Waring commercial blender, 50 parts of a 3.3% aqueous solution of Airvol 540 polyvinyl alcohol, 50 parts of Dow PAPI 2027 polymethylene polyphenylisocyanate and 0.6 parts Triton X-100 surfactant (Rohm & Haas, Philadelphia, Pa.) for one minute at room temperature (70° F.). Particle size of this emulsion was measured at approximately 1 micron. The Dow PAPI 2027 material used for this testing had a functionality of 2.7.

The isocyanate emulsion was added immediately to the polyamide production microcapsule slurry and heated to about 150° C. for about 1 hour to fully react the MDI at the capsule surface and with residual diethylenetriamine in the aqueous capsule slurry matrix. The isocyanate emulsion was added to the standard polyamide production capsules in varying amounts of 4%, 8%, 12%, 16%, 20% and 24%, by weight per dry weight of microcapsules (2%, 4%, 6%, 8%, 10% and 12% wt. of isocyanate compound per wt. of capsules). Coatings were made for each sample by drawing down over 13 pound Great Northern 100% groundwood fiber base stock paper using a number 7 Meier rod. Also, each coating was drawn down over Moore 2010 CF reference standard.

The capsules were tested as in Example 1. The results are shown in Table 2.

It can be seen from the results in Table 2 that, with conventional polyamide production capsules, yellowing decreases and whiteness increases as larger amounts of isocyanate emulsion are added up to 12% by weight. Also, the difference between before heating and after heating reflectance, which is a measure of permeability, decreases as the amount of isocyanate increases. This shows that the isocyanate emulsion treatment improves impermeability.

Example 3

Microcapsules made by the reduced amine production process were treated with an isocyanate emulsion in accordance with the invention. As in Example 2, the capsules were treated with different amounts of Dow PAPI 2027 isocyanate emulsion and tested to determine yellowing and permeability as compared to untreated capsules.

The reduced amine polyamide production capsules were made by the same procedure as in Example 2 except the diethylenetriamine was reduced to stoichiometric equivalency (an equimolar ratio of diethylenetriamine and acid chloride) and all caustic soda was withheld from the aqueous monomer tank.

After curing under the same conditions as in Example 2, a 15–17% caustic soda solution was slowly added to the capsule polymerization tank until a neutral pH was achieved.

The capsules were treated with the isocyanate emulsion as in Example 2 and tested as in Examples 1 and 2. The results are shown in Table 3.

It can be seen from the results in Table 3 that, with reduced amine polyamide production capsules, like conventional capsules, yellowing decreases and whiteness increases as larger amounts of isocyanate are added up to 12% by weight. Also, the difference between before heating and after heating reflectance, a measure of permeability, decreases as the amount of isocyanate increases, indicating improved impermeability.

Example 4

To determine whether treatment of the microcapsules with the isocyanate emulsion in accordance with the invention caused any loss in imaging properties or a decrease in scuff resistance, the following tests were conducted. The conventional polyamide production capsules of Example 2, untreated with isocyanate emulsion, and the reduced amine polyamide production capsules of Example 3, both untreated with isocyanate emulsion and treated with 6% Dow PAPI 2027 isocyanate emulsion, were used in testing to determine imaging intensity and scuff resistance.

Capsule slurries in this Example were compounded with about 25 parts dry offset starch (Keestar 328 from Ogilvie Mills, Minnetonka, Minn.) on dry capsules and about 2 parts dry polyvinyl alcohol (Airvol 325 from Air Products) before coating on carbonless base paper. Compounding was done to represent a final coating formula, complete with damage protection agent (offset starch) and coating binder (polyvinyl alcohol).

Image intensity was determined for each of the three samples using a Photovolt Model 575 reflectance meter. Readings were taken after coating each of the microcapsule coatings as a coated back (CB) layer onto Champion 12# carbonless base paper. This coated substrate was then placed into face-to-face contact with a coated front (CF) substrate coated on E. B. Eddey 12# carbonless base paper. This CB-CF sandwich was then calendered in either a low pressure or high pressure calender tester. The low pressure calender tester contained a small motor driven roller on the bottom and a matching idler roller that ran against it from above. The idler roll was mounted in an arm (fulcrum) that was weighted toward its end. This created enough pressure to break most of the CB microcapsules. The high pressure calender tester was similar to the low pressure tester except that the force exerted on the top roller was created by an air cylinder rather than weights. This created enough pressure to break all the CB microcapsules. Image shade was then determined after 5 minutes and 24 hours. Results are shown in Table 4.

A set of three scuff tests were done on each sample. The scuff test was performed by affixing a piece of CF reference standard to a stationary arm held against a rotatable wheel by an air cylinder at about 40 psi. A piece of the test CB is affixed to the wheel so the CB side is facing out. When released by a lever, the wheel, with the CB attached, rotates one revolution against the CF, causing a scuffing action. The image development from the resulting capsule damage caused by the CB rotating against the CF is measured with a reflectance meter so a relative comparison can be made. Scuff readings were taken after full image development. See results in Table 4. Coating weights were determined using high pressure liquid chromatography.

It can be seen from the test results in Table 4 that polyamide microcapsules coated with an 6% by weight isocyanate emulsion in accordance with the invention provide an image after calendaring that is slightly better than uncoated capsules. In addition, the coated capsules have comparable scuff properties.

It will be apparent to those skilled in the art that various modifications and variations can be made in the microcapsules and process for their manufacture and use without departing from the spirit or scope of the invention. Thus, it is intended that the present invention cover the modifications and variations of this invention provided that they come within the scope of the appended claims and their equivalents.

What is claimed is:

1. A process for producing highly impermeable, reduced-yellowing, pressure rupturable microcapsules for use in carbonless copying systems, comprising:

providing a slurry of pressure rupturable microcapsules, each microcapsule including a core material and at least one generally continuous polyamide wall encapsulating said core material; and contacting said slurry of microcapsules with an isocyanate emulsion.

2. The process of claim 1, wherein said isocyanate is a polyfunctional isocyanate.

TABLE 1

| Reduced Amine Polyamide Laboratory Capsules | YI313 | WI313 | Reflect. Bef.Hta. | Reflect. Aft.Hta. | Reflect Diff. |
|---|---|---|---|---|---|
| No isocyanate added | 24.6 | 1.2 | 88.8 | 41.1 | 47.7 |
| 8% isocyanate | 17.9 | 19.4 | 89.8 | 87.0 | 2.8 |
| uncoated 100% groundwood paper | 16.8 | 22.6 | — | — | — |

TABLE 2

| Conventional Polyamide Production Capsules | YI313 | WI313 | Reflect. Bef.Hta. | Reflect. Aft.Hta. | Reflect Diff. |
|---|---|---|---|---|---|
| No isocyanate added | 33.9 | −23.4 | 94.6 | 80.6 | 14.0 |
| 2% isocyanate | 34.0 | −23.8 | 95.6 | 82.1 | 13.5 |
| 4% isocyanate | 31.4 | −16.8 | 96.0 | 88.9 | 7.1 |
| 6% isocyanate | 31.5 | −17.2 | 96.6 | 92.7 | 3.9 |
| 8% isocyanate | 31.4 | −17.0 | 96.6 | 94.7 | 1.9 |
| 10% isocyanate | 30.4 | −14.4 | 95.6 | 94.2 | 1.4 |
| 12% isocyanate | 29.0 | −10.5 | 95.4 | 96.0 | −0.6 |

TABLE 3

| Reduced Amine Polyamide Production Capsules | YI313 | WI313 | Reflect. Bef.Hta. | Reflect. Aft.Hta. | Reflect Diff. |
|---|---|---|---|---|---|
| No isocyanate added | 26.7 | −4.6 | 95.4 | 84.3 | 11.1 |
| 2% isocyanate | 25.0 | 0.1 | 94.7 | 88.4 | 6.3 |
| 4% isocyanate | 25.5 | −1.3 | 94.2 | 88.9 | 5.3 |
| 6% isocyanate | 22.0 | 8.1 | 93.5 | 92.1 | 1.4 |
| 8% isocyanate | 20.6 | 11.6 | 93.3 | 93.9 | −0.6 |
| 10% isocyanate | 20.3 | 13.1 | 92.4 | 92.9 | −0.5 |
| 12% isocyanate | 20.0 | 12.2 | 92.9 | 94.3 | −1.4 |

TABLE 4

| | 5 MIN LO PR CAL | 24 HR LO PR CAL | 5 MIN HI PR CAL | 24 HR HI PR CAL | CPSL CTG WT | TOTL CTG WT | SCUFF |
|---|---|---|---|---|---|---|---|
| Conv'l Polyamide Prod'n Capsules- No isocyanate added | 55.5 | 53.0 | 35.3 | 33.4 | 0.72 | 0.88 | 88.6 |
| Red'd Amine Polyamide Prod'n Capsules- No isocyanate added | 53.1 | 49.1 | 34.8 | 32.2 | 0.66 | 0.81 | 87.0 |
| Red'd Amine Polyamide Prod'n Capsules- 6% isocyanate | 57.6 | 55.6 | 36.2 | 34.2 | 0.61 | 0.80 | 87.7 |

3. The process of claim 1, wherein said isocyanate emulsion comprises an aqueous emulsion of diphenylmethane diisocyanate or toluene diisocyanate, or isomers and oligomers of said diisocyanates.

4. The process of claim 3, wherein said isocyanate emulsion comprises an aqueous emulsion of 4,4'-diphenylmethane diisocyanate or isomers and oligomers of said diisocyanate.

5. The process of claim 4, wherein said isocyanate emulsion comprises about a 50% by weight aqueous emulsion of an oligomer of 4,4'-diphenylmethane diisocyanate in about 3% aqueous polyvinyl alcohol solution.

6. The process of claim 5, wherein said isocyanate comprises:

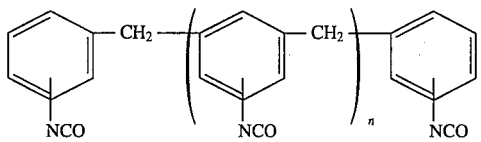

wherein n ranges from 0 to about 4.

7. The process of claim 1, wherein said microcapsules are comprised of polyterephthalamide.

8. The process of claim 1, wherein said encapsulating walls are formed by interfacial polycondensation.

9. The process of claim 1, wherein said isocyanate is present in an amount ranging from about 1 to about 12 parts by dry weight per 100 parts by dry weight of microcapsules.

10. The process of claim 9, wherein said isocyanate is present in an amount ranging from about 5 to about 7 parts by dry weight per 100 parts by dry weight of microcapsules.

11. A process for producing highly impermeable, reduced-yellowing, pressure rupturable microcapsules for use in carbonless copying systems, comprising:

providing in a continuous phase a dispersed phase of minute discrete droplets containing a core material;

forming generally continuous encapsulating walls of polyamide around the minute discrete droplets to thereby produce a slurry of pressure rupturable microcapsules;

adding an isocyanate emulsion to said microcapsule slurry; and heating said isocyanate emulsion and microcapsule slurry to a temperature and for a time sufficient to cause said isocyanate to react with the surfaces of said polyamide microcapsule walls to close discontinuities in the outer portion of said walls, and to react with free amine in the microcapsule slurry to reduce a potential source of yellowing.

12. The process of claim 11, wherein said isocyanate is a polyfunctional isocyanate.

13. The process of claim 11, wherein said isocyanate emulsion comprises an aqueous emulsion of diphenylmethane diisocyanate or toluene diisocyanate, or isomers and oligomers of said diisocyanates.

14. The process of claim 11, wherein said isocyanate emulsion comprises an aqueous emulsion of 4,4'-diphenylmethane diisocyanate and isomers and oligomers of said diisocyanate.

15. The process of claim 14, wherein said isocyanate emulsion comprises about a 50% by weight aqueous emulsion of an oligomer of 4,4'-diphenylmethane diisocyanate in about 3% aqueous polyvinyl alcohol solution.

16. The process of claim 15, wherein said isocyanate comprises:

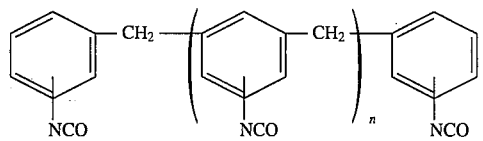

wherein n ranges from 0 to about 4.

17. The process of claim 11, wherein said microcapsules are comprised of polyterephthalamide.

18. The process of claim 11, wherein said encapsulating walls are formed by interfacial polycondensation.

19. The process of claim 11, wherein said isocyanate is present in an amount ranging from about 1 to about 12 parts by dry weight per 100 parts by dry weight of microcapsules.

20. The process of claim 19, wherein said isocyanate is present in an amount ranging from about 5 to about 7 parts by dry weight per 100 parts by dry weight of microcapsules.

21. The process of claim 11, wherein said microcapsule slurry and isocyanate emulsion is heated to a temperature ranging from about 50° to about 75° C. for a time ranging from about 5 to about 120 minutes.

22. A process for producing highly impermeable, reduced-yellowing, pressure rupturable microcapsules for use in carbonless copying systems, comprising:

providing a mixture of a core material and an acid chloride;

emulsifying said mixture in an emulsifying agent to obtain an oil-in-water emulsion of microparticles; adding a polyfunctional amino compound to said emulsion to form a slurry of pressure rupturable polyamide microcapsules;

adding a neutralizing solution to said slurry of microcapsules;

adding an isocyanate emulsion to said microcapsule slurry;

heating said isocyanate emulsion and microcapsule slurry to a temperature and for a time sufficient to cause said isocyanate to react with the surfaces of said polyamide microcapsule walls to close discontinuities in the outer portion of said walls, and to react with free amine in the microcapsule slurry to reduce a potential source of yellowing.

23. The process of claim 22, wherein said emulsifying agent comprises a polyvinyl alcohol.

24. The process of claim 22, wherein said polyfunctional amino compound comprises diethylenetriamine.

25. The process of claim 22, wherein said isocyanate is a polyfunctional isocyanate.

26. The process of claim 22, wherein said isocyanate emulsion comprises an aqueous emulsion of diphenylmethane diisocyanate or toluene diisocyanate, or isomers and oligomers of said diisocyanates.

27. The process of claim 26, wherein said isocyanate emulsion comprises an aqueous emulsion of 4,4'-diphenylmethane diisocyanate or isomers and oligomers of said diisocyanate.

28. The process of claim 27, wherein said isocyanate emulsion comprises about a 50% by weight aqueous emulsion of an oligomer of 4,4'-diphenylmethane diisocyanate in about 3% aqueous polyvinyl alcohol solution.

29. The process of claim 28, wherein said isocyanate comprises:

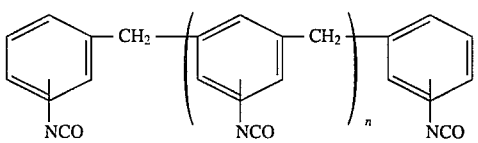

wherein n ranges from 0 to about 4.

30. The process of claim 22, wherein said microcapsules are comprised of polyterephthalamide.

31. The process of claim 22, wherein said isocyanate is present in an amount ranging from about 2 to about 12 parts by dry weight per 100 parts by dry weight of microcapsules.

32. The process of claim 31, wherein said isocyanate is present in an amount ranging from about 5 to about 7 parts by dry weight per 100 parts by dry weight of microcapsules.

33. The process of claim 22, wherein said microcapsule slurry and isocyanate emulsion is heated to a temperature ranging from about 50° to about 75° C. for a time ranging from about 5 to about 120 minutes.

34. A pressure rupturable microcapsule for use in carbonless copying systems, comprising:

a core material; and at least one substantially continuous, pressure rupturable polyamide wall encapsulating said core material;

wherein at least a portion of the outer surface of said microcapsule comprises the reaction product of an isocyanate emulsion and the outer surface of the microcapsule wall.

35. The microcapsule of claim 34, wherein said isocyanate is a polyfunctional isocyanate.

36. The microcapsule of claim 34, wherein said isocyanate emulsion comprises an aqueous emulsion of diphenylmethane diisocyanate or toluene diisocyanate, or isomers and oligomers of said diisocyanates.

37. The microcapsule of claim 36, wherein said isocyanate emulsion comprises an aqueous emulsion of 4,4'-diphenylmethane diisocyanate or isomers and oligomers of said diisocyanate.

38. The microcapsule of claim 37, wherein said isocyanate emulsion comprises about a 50% by weight aqueous emulsion of an oligomer of 4,4'-diphenylmethane diisocyanate in about 3% aqueous polyvinyl alcohol solution.

39. The microcapsule of claim 38, wherein said isocyanate comprises:

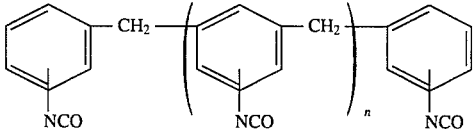

wherein n ranges from 0 to about 4.

40. The microcapsule of claim 34, wherein said microcapsule wall is comprised of polyterephthalamide.

41. The microcapsule of claim 34, wherein said core material is a colorless dye precursor.

42. A pressure rupturable microcapsule for use in carbonless copying systems, comprising:

a core material; and at least one substantially continuous, pressure rupturable polyamide wall encapsulating said core material;

wherein at least a portion of the outer surface of said microcapsule comprises a polyamide/polyurea copolymer.

43. A pressure rupturable microcapsule for use in carbonless copying systems, comprising:

a minute discrete droplet of core material;

a pressure rupturable, generally continuous wall encapsulating the droplet, said wall comprising at least one layer of polyamide;

wherein discontinuities in the outer layer of said polyamide wall are closed by the reaction product of an isocyanate emulsion and the polyamide of said outer layer.

44. The microcapsule of claim 43, wherein said isocyanate is a polyfunctional isocyanate.

45. The microcapsule of claim 43, wherein said isocyanate emulsion comprises an aqueous emulsion of diphenylmethane diisocyanate or toluene diisocyanate, or isomers and oligomers of said diisocyanates.

46. The microcapsule of claim 45, wherein said isocyanate emulsion comprises an aqueous emulsion of 4,4'-diphenylmethane diisocyanate or isomers and oligomers of said diisocyanate.

47. The microcapsule of claim 46, wherein said isocyanate emulsion comprises about a 50% by weight aqueous emulsion of an oligomer of 4,4'-diphenylmethane diisocyanate in about 3% aqueous polyvinyl alcohol solution.

48. The microcapsule of claim 47, wherein said isocyanate comprises:

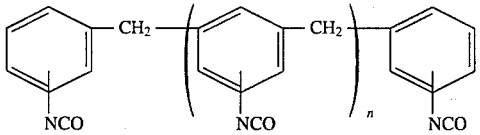

wherein n ranges from 0 to about 4.

49. The microcapsule of claim 43, wherein said microcapsules are comprised of polyterephthalamide.

50. The microcapsule of claim 43, wherein said core material is a colorless dye precursor.

51. A pressure rupturable microcapsule for use in carbonless copying systems, comprising:

a minute discrete droplet of core material;

a pressure rupturable, generally continuous wall encapsulating the droplet, said wall comprising at least one layer of polyamide;

wherein discontinuities in the outer layer of said polyamide wall are closed by a copolymer of polyamide/polyurea.

52. A carbonless copying system comprising a substrate, a coating containing a plurality of the microcapsules of claim 34 over at least a portion of the substrate and a material in reactive contact with said microcapsules capable of reacting with said microcapsule core material to produce a colored reaction product.

53. A carbonless copying system comprising a substrate, a coating containing a plurality of the microcapsules of claim 42 over at least a portion of the substrate and a material in reactive contact with said microcapsules capable of reacting with said microcapsule core material to produce a colored reaction product.

* * * * *